United States Patent
Czech et al.

(10) Patent No.: US 11,824,222 B2
(45) Date of Patent: Nov. 21, 2023

(54) HIGH-VOLTAGE BATTERY FOR AN ELECTRICALLY OPERATED VEHICLE

(71) Applicant: AUDI AG, Ingolstadt (DE)

(72) Inventors: Marvin Czech, Ingolstadt (DE); Eduard Main, Buxheim (DE)

(73) Assignee: AUDI AG, Ingolstadt (DE)

( * ) Notice: Subject to any disclaimer, the term of this patent is extended or adjusted under 35 U.S.C. 154(b) by 231 days.

(21) Appl. No.: 17/236,169

(22) Filed: Apr. 21, 2021

(65) Prior Publication Data

US 2021/0351474 A1    Nov. 11, 2021

(30) Foreign Application Priority Data

May 7, 2020    (DE) .................... 10 2020 112 426.0

(51) Int. Cl.
*H01M 50/244*    (2021.01)
*H01M 50/342*    (2021.01)
(Continued)

(52) U.S. Cl.
CPC ......... *H01M 50/3425* (2021.01); *B60L 50/64* (2019.02); *H01M 50/209* (2021.01);
(Continued)

(58) Field of Classification Search
CPC ........... H01M 50/3425; H01M 50/209; H01M 50/244; H01M 50/249; H01M 2200/10;
(Continued)

(56) References Cited

U.S. PATENT DOCUMENTS

| | | | | |
|---|---|---|---|---|
| 6,278,259 B1* | 8/2001 | Kimoto | ............... | H01M 50/358 320/147 |
| 2011/0059341 A1* | 3/2011 | Matsumoto | ......... | H01M 10/052 429/82 |

(Continued)

FOREIGN PATENT DOCUMENTS

| EP | 2 445 032 A1 | 4/2012 |
|---|---|---|
| EP | 2 581 960 A1 | 4/2013 |

(Continued)

OTHER PUBLICATIONS

Examination Report dated Dec. 15, 2020 in corresponding German application No. 10 2020 112 426.0; 10 pages including Machine-generated English-language translation.

(Continued)

*Primary Examiner* — Michael L Dignan
(74) *Attorney, Agent, or Firm* — Maier & Maier, PLLC

(57) ABSTRACT

A high-voltage battery for an electrically operated vehicle, the battery housing of which has a housing cover and a housing lower part which delimit a housing interior which is divided into at least one battery cell compartment equipped with battery cells and at least one component compartment for electronic components. A degassing space is formed between a battery cell top of the battery cells and the housing cover, into which space hot exhaust gas flows during a thermal event in one of the battery cells from an exhaust gas outlet of the damaged battery cell. The high-voltage battery has a partition wall which separates the degassing space from the component compartment.

12 Claims, 1 Drawing Sheet

(51) Int. Cl.
  *B60L 50/64* (2019.01)
  *H01M 50/249* (2021.01)
  *H01M 50/209* (2021.01)

(52) U.S. Cl.
  CPC ....... *H01M 50/244* (2021.01); *H01M 50/249* (2021.01); *H01M 2200/10* (2013.01); *H01M 2220/20* (2013.01)

(58) Field of Classification Search
  CPC . H01M 2220/20; H01M 50/367; B60L 50/64; B60L 3/0046; B60L 50/66; Y02E 60/10; Y02T 10/70
  See application file for complete search history.

(56) References Cited

U.S. PATENT DOCUMENTS

| | | | | |
|---|---|---|---|---|
| 2012/0261206 A1* | 10/2012 | Yasui | ................... | B60L 50/64 180/274 |
| 2014/0193683 A1* | 7/2014 | Mardall | ................. | B60K 1/04 429/99 |
| 2014/0370336 A1* | 12/2014 | Reitzle | ............ | H01M 50/3425 429/56 |
| 2017/0346050 A1* | 11/2017 | Morioka | ............. | H01M 50/249 |
| 2018/0047959 A1* | 2/2018 | Kruger | ................ | H01M 50/367 |
| 2020/0083502 A1* | 3/2020 | Fan | ................... | H01M 50/3425 |
| 2020/0112009 A1* | 4/2020 | Riley | ................. | H01M 50/308 |
| 2020/0136110 A1* | 4/2020 | Koutari | ................ | H01M 50/24 |

FOREIGN PATENT DOCUMENTS

| | | |
|---|---|---|
| JP | 2002084604 A | 3/2002 |
| JP | 2013168318 A | 8/2013 |
| JP | 2015135763 A | 7/2015 |
| JP | 2015211025 A | 11/2015 |
| KR | 1020170069003 A | 6/2017 |
| WO | 2014/139710 A1 | 9/2014 |
| WO | 2016/053404 A1 | 4/2016 |

OTHER PUBLICATIONS

Office Action dated Dec. 1, 2022, in corresponding Chinese Application No. 202110514307.3, 14 pages.

* cited by examiner

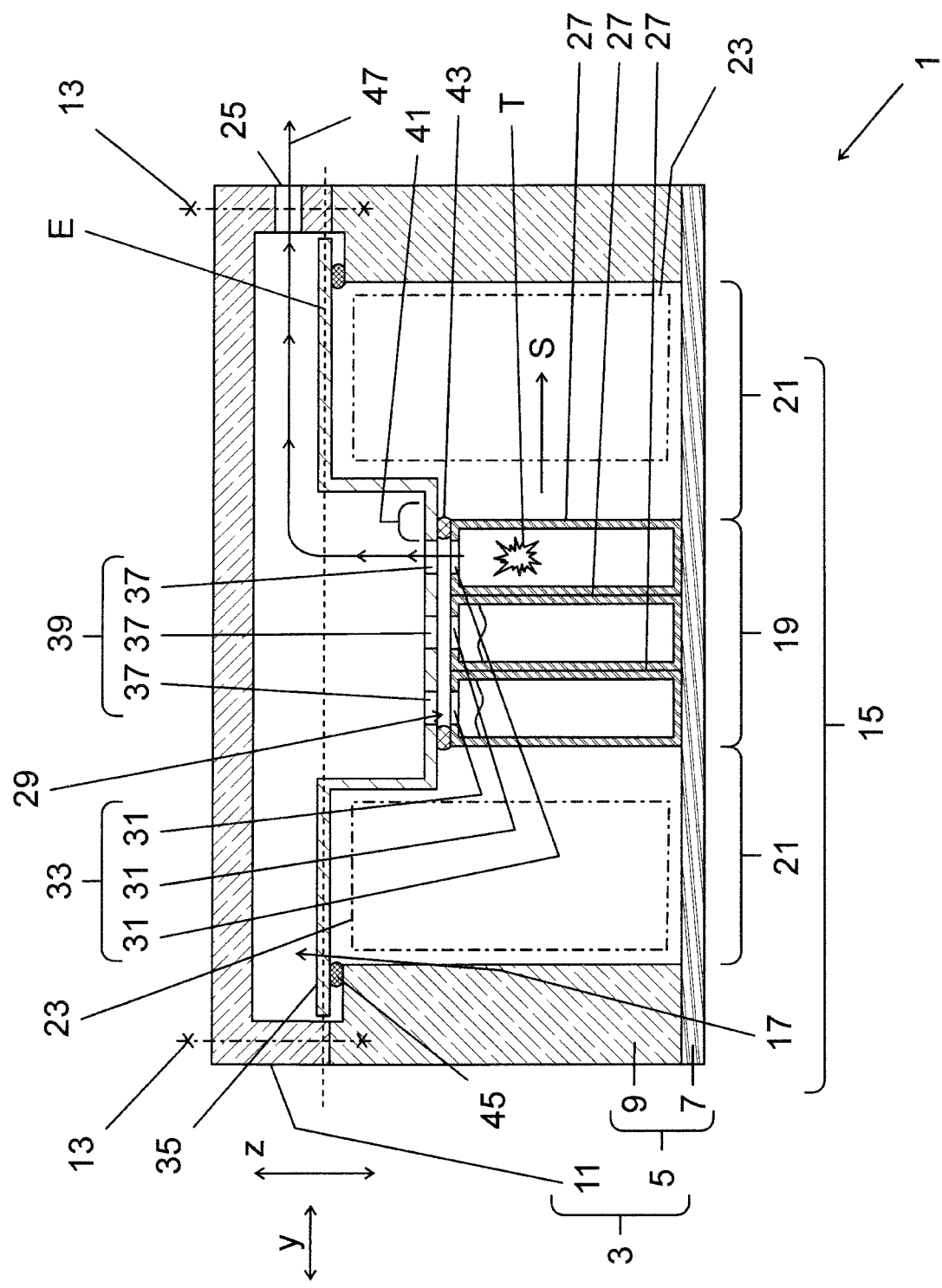

HIGH-VOLTAGE BATTERY FOR AN ELECTRICALLY OPERATED VEHICLE

FIELD

The disclosure relates to a high-voltage battery for an electrically operated vehicle and a method for mounting the high-voltage battery.

BACKGROUND

A generic high-voltage battery for an electrically operated vehicle has a housing cover and a housing lower part, which together delimit a housing interior. The housing interior is divided into a battery cell compartment and a component compartment. Battery cells are arranged in the battery cell compartment, and at least one electronic component is arranged in the component compartment. A degassing space extends between a cell top of the battery cells and the housing cover, into which space hot exhaust gas flows from an exhaust gas outlet of the damaged battery cell in the event of a thermal event in one of the battery cells. In addition, the electronic component is also exposed to the hot exhaust gas when the thermal event occurs. Exposure to the hot exhaust gas can disadvantageously lead to a temporary or permanent reduction of the functionality of the electronic component.

A degassing system for a battery module is known from WO 2016/053 404 A1. EP 2 581 960 A1 discloses a battery pack. A battery module is known from EP 2 445 032 A1.

SUMMARY

The object of the disclosure is to provide a high-voltage battery in which the functionality of the electronic component is fully ensured when a thermal event occurs.

According to the disclosure, the high-voltage battery has a partition wall which separates the degassing space from the component compartment. The partition wall ensures in an advantageous manner that the hot exhaust gas does not interact with the electronic component. As a result, the hot exhaust gas cannot impair the functionality of the electronic component.

In a preferred embodiment, the partition can be an intermediate floor which can extend in a horizontal device plane between the housing cover and the cell top of the battery cells. This has the advantage that high-voltage batteries with battery cells arranged vertically can easily be retrofitted with the intermediate floor.

The intermediate floor can preferably have at least one exhaust gas passage, the opening edge of which can be supported on the cell top. In addition, the opening edge can encircle at least one exhaust gas outlet on the cell side. Due to the defined exhaust gas passage and the support of the opening edge on the cell top, a seal between the degassing space and the component compartment is achieved in a structurally simple manner. This has the advantage that the hot exhaust gas is passed directly into the degassing chamber, that is to say, without flowing into the component compartment, and from there it is released to the surroundings of the battery.

Particularly preferably, the opening edge of the exhaust gas passage can be supported on the cell top with the interposition of a sealing element, by means of which the sealing effect between the degassing space and the component compartment can be increased. The provision of the sealing element has the advantage that the sealing effect between the degassing space and the component compartment is increased.

In one embodiment, the housing lower part can be provided in an empty state, that is to say, still unequipped and open at the top in the vertical direction of the housing for battery assembly in preparation for a setting process. In addition, in the setting process, the electrical components and the battery cells can be inserted into the component compartment and into the battery cell compartment in a setting direction along the vertical direction of the battery. In addition, after the setting process, the partition wall can be inserted into the housing lower part and the housing lower part, which is open at the top, can then be closed by means of the housing cover. With this structure and assembly, the high-voltage battery can be assembled in a few assembly steps and thus in an efficient manner.

The component compartment and the battery cell compartment can preferably be positioned laterally next to one another in a transverse direction of the battery in the housing lower part, and particularly the degassing space can be arranged in the vertical direction of the housing between the housing cover and the top of the battery cell, wherein the partition wall can particularly cover the component compartment. By arranging the degassing space in the vertical direction of the housing above the battery cells, the overflow of the hot exhaust gas into the degassing space is enhanced in an advantageous manner. The positioning of the component compartment between the battery cell compartment and the housing side wall has the advantage that the battery cells can be inserted into the battery cell compartment without disruptive contours, since the component compartment provides a circumferential installation space for the assembly of the battery cells. This is particularly advantageous if the battery cells are packaged in module units and are inserted from above into the housing lower part when the high-voltage battery is installed in the vertical direction of the battery.

In addition, depending on the concept, the cells can also be positioned directly on the side wall of the housing. Particularly, positioning of the battery cells in the high-voltage battery depends on the installation conditions, modularization, component tolerances, the connection technology used, and the mounting of the battery cells. The positioning of the battery cells can also be made dependent on the provision of functional installation spaces, the housing concept, the bias, and operating loads of the cells as well as the thermal concept of the battery cells. With regard to the installation conditions, particularly the installation position and the installation tolerances can have an impact on the positioning selection With regard to modularization, the grouping of the battery cells as well as the resulting tolerances and the resulting mounting concepts can influence the positioning of the battery cells. For example, deformation zones can serve as functional installation spaces which prevent block formation in the event of a crash. The housing concept also influences the positioning. In this context, the positioning of the battery cells can be made dependent on whether the housing is constructed from individual parts or in multiple parts. In addition, parting planes can be important with regard to the housing concept.

In one embodiment, the housing lower part can have a housing base and a housing side wall that is raised to the side thereof. In addition, the component compartment, viewed in the transverse direction of the battery, can be delimited laterally on the outside by the housing side wall and can be delimited laterally on the inside by the battery cell compartment. In addition or alternatively, the intermediate base can be supported on the edge of the housing side wall, specifically with an outer sealing element interposed. This has the advantage that no hot exhaust gas can flow over from the degassing space into the component compartment in the edge area of the intermediate floor either.

The degassing space can preferably be fluid-connectable to the battery environment via at least one degassing opening on the housing side. This ensures in a simple manner that the hot exhaust gas can flow out of the degassing space into the battery environment.

The battery cells can particularly preferably be designed as prismatic battery cells which are arranged one behind the other in a stacking direction. Alternatively or additionally, the exhaust gas outlet can be located on the cell top, and the exhaust gas outlet can be provided with a rupture disc. In addition, the housing-side degassing opening can be provided on the housing cover. Arrangement of the exhaust gas outlet on the cell top has the advantage that the hot exhaust gas, which can have a low density compared to air, reliably flows out of the battery cell in the upright direction of the battery and against the direction of gravity.

In a technical embodiment, the stacking direction can run at right angles to the vertical direction of the battery and in the transverse direction of the battery. In addition, a pressure equalization element can be provided on both the degassing space and the component compartment that enables pressure equalization between the battery environment on the one hand and the degassing space or the component compartment on the other. In addition, the sealing element and the outer sealing element can each be a sealing element made of foam rubber. The exhaust gas outlet can be provided with at least one rupture disk. In addition, a spark guard in the form of a glass fiber fleece can be provided at the exhaust gas outlet, which advantageously prevents sparks from entering the degassing space from the battery cell compartment. The partition wall can be a partition wall made of electrically insulating material and can optionally form a double flange connection at the edge together with the housing cover and the housing lower part, via which the partition wall can be braced with the housing cover and the housing lower part. In a preferred embodiment, the degassing space can be formed by a vehicle rocker panel.

A method for assembling a high-voltage battery according to the disclosure is also an aspect of the disclosure.

An exemplary embodiment of the disclosure is described below on the basis of the appended FIGURES.

BRIEF DESCRIPTION OF THE FIGURE(S)

FIG. 1 is a sectional view showing a high-voltage battery according to the disclosure.

DETAILED DESCRIPTION

FIG. 1 shows a high-voltage battery 1 with a battery housing 3. The battery housing 3 has a housing lower part 5 consisting of a housing base 7 and housing side walls 9 raised to the sides thereof. A housing cover 11 is placed on the housing lower part 5 and is clamped to the housing lower part 5 at screw points 13. The housing lower part 5 and the housing cover 11 together enclose a housing interior 15.

The housing interior 15 is divided into a degassing space 17, a battery cell compartment 19 and a component compartment 21 in which electronic components 23 are arranged. The degassing space 17 is fluid-connected to the battery environment via a housing-side degassing opening 25 and, in relation to a battery vertical direction z, is arranged above the battery cell compartment 19 and above the component compartment 21. In the battery cell compartment 19, prismatic battery cells 27 (three such battery cells 27 are shown by way of example) are arranged one behind the other in a stacking direction S. The component compartment 21 and the battery cell compartment 19 are positioned laterally next to one another in a battery transverse direction y in the housing lower part 5, such that the battery cells 27 delimit the component compartment 21 laterally inward. The component compartment 21 is delimited laterally on the outside by the housing side walls 9. The battery cells 27 have a cell top 29 on which each of the battery cells 27 is provided with an exhaust gas opening 31, which together form an exhaust gas outlet 33 on the cell side.

In the housing interior 15, a plate-shaped intermediate floor 35 is provided which runs in a horizontal device plane E and extends between the housing cover 11 and the cell top 29, covering the component compartment 21, such that the degassing space 17 is arranged in the vertical direction z of the housing between the housing cover 11 and the cell top 29. The intermediate floor 35 has multiple openings 37 which together form an exhaust gas passage 39. In addition, the intermediate floor 35 has an opening edge 41 which completely surrounds the exhaust gas outlet 33 and which is supported on the cell top 29 with a closed annular sealing element 43 interposed in between. The degassing space 17 is thus sealed against the component compartment 21 in a gas-tight or flow-tight manner. In addition, the intermediate floor 35 is supported on the edge side and with the interposition of an outer and closed annular sealing element 45 on the housing side walls 9.

In FIG. 1, the battery cell 27 shown on the right is shown as an example of a damaged battery cell 27 in which, as a result of a thermal event T, hot exhaust gas is formed, which is conducted out of the battery housing 3 into the battery environment along an exhaust gas flow path 47. The hot exhaust gas first exits the battery cell 27 at an exhaust gas opening 31 belonging to the battery cell 27 and flows into the degassing chamber 17 via the exhaust gas passage 39, without the hot exhaust gas flowing into the component compartment 21. The hot exhaust gas is discharged from the degassing space 17 via the housing-side degassing opening 19 into the environment of the battery.

The invention claimed is:

1. A high-voltage battery for an electrically operated vehicle, the battery housing of which comprising a housing cover and a housing lower part which delimit a housing interior,
   wherein the housing interior is divided into at least one battery cell compartment which contains a plurality of battery cells and which is circumscribed by at least one component compartment which contains one or more electronic components,
   wherein a degassing space is formed between a battery cell top of the battery cells and the housing cover, into which space hot exhaust gas from an exhaust gas outlet of one or more of the battery cells is flowable during a thermal event,
   wherein the high-voltage battery has a partition wall which separates the degassing space from the at least one component compartment,
   wherein an outer edge of the partition wall is supported on an edge of the housing lower part by a first sealing element and an inner edge of the partition wall is supported on the battery cell top with a second sealing element, the first and second sealing elements thereby preventing the hot exhaust gas from entering the at least one component compartment, and wherein the degassing space is formed by a rocker panel of the electrically operated vehicle.

2. The high-voltage battery according to claim 1, wherein the partition wall is an intermediate floor which extends in a horizontal device plane between the housing cover and the battery cell top.

3. The high-voltage battery according to claim 2, wherein the intermediate floor has at least one exhaust gas passage, an opening edge of which is supported on the battery cell top, and wherein the opening edge at least surrounds the exhaust gas outlet.

4. The high-voltage battery according to claim 3, wherein the second sealing element is provided between the opening edge and the battery cell top.

5. The high-voltage battery according to claim 1, wherein, in an empty state, the housing lower part has an open top into which the electronic components and battery cells are first inserted along a vertical direction before the partition wall is then inserted into the housing lower top, and wherein the housing lower part is closable by the housing cover after the partition wall is inserted.

6. The high-voltage battery according to claim 1, wherein the at least one component compartment and the at least one battery cell compartment are positioned laterally next to each other in a battery transverse direction in the housing lower part, wherein the degassing space is arranged in the vertical housing direction between the housing cover and the battery cell top, and wherein the partition wall covers the at least one component compartment.

7. The high-voltage battery according to claim 1, wherein the housing lower part has a housing base and a housing side wall raised laterally thereof, and the at least one component compartment, viewed in a transverse direction of the battery, is delimited laterally outside by the housing side wall and laterally inside by the at least one battery cell compartment, and wherein the edge of the housing lower part is an edge of the housing side wall.

8. The high-voltage battery according to claim 1, wherein the degassing space is fluidically connected to an environment of the high-voltage battery via at least one housing-side degassing opening.

9. The high-voltage battery according to claim 8, wherein the battery cells are designed as a stack of prismatic battery cells, and wherein the exhaust gas outlet is located on the battery cell top, the exhaust gas outlet is provided with a rupture disc, and the housing-side degassing opening is provided on the housing cover.

10. The high-voltage battery according to claim 1, wherein each of the exhaust gas outlets are provided with a spark guard.

11. The high-voltage battery according to claim 10, wherein the spark guard comprises a glass fiber fleece.

12. The high-voltage battery according to claim 1, wherein the partition wall forms a double flange connection with the housing cover and the housing lower part.

* * * * *